(12) United States Patent
Hu et al.

(10) Patent No.: US 7,197,449 B2
(45) Date of Patent: Mar. 27, 2007

(54) METHOD FOR EXTRACTING NAME ENTITIES AND JARGON TERMS USING A SUFFIX TREE DATA STRUCTURE

(75) Inventors: Zengjian Hu, Burnaby (CA); Yimin Zhang, Beijing (CN); Joe F. Zhou, Beijing (CN)

(73) Assignee: Intel Corporation, Santa Clara, CA (US)

( * ) Notice: Subject to any disclaimer, the term of this patent is extended or adjusted under 35 U.S.C. 154(b) by 863 days.

(21) Appl. No.: 10/017,408

(22) Filed: Oct. 30, 2001

(65) Prior Publication Data

US 2003/0083862 A1 May 1, 2003

(51) Int. Cl.
G06F 17/20 (2006.01)
G06F 17/21 (2006.01)
G06F 17/27 (2006.01)

(52) U.S. Cl. .............................................. 704/9; 704/1

(58) Field of Classification Search .................... 704/9, 704/1

See application file for complete search history.

(56) References Cited

U.S. PATENT DOCUMENTS

| | | | | |
|---|---|---|---|---|
| 5,384,703 A * | 1/1995 | Withgott et al. | ............ | 715/531 |
| 5,638,543 A * | 6/1997 | Pedersen et al. | ................ | 704/1 |
| 6,098,034 A * | 8/2000 | Razin et al. | .................... | 704/9 |
| 7,020,587 B1 * | 3/2006 | Di et al. | ......................... | 703/2 |
| 2003/0014448 A1 * | 1/2003 | Castellanos et al. | ......... | 707/530 |

OTHER PUBLICATIONS

Chien, Lee-Feng. "PAT-Tree-Based Keyword Extraction for Chinese Information Retrieval", Annual ACM Conference on Research and Development in Information Retrieval, 1997, pp. 50-58.*

Yamamoto, M. Church, K. "Using suffix arrays to compute term frequency and document frequency for all substrings in a corpus" Computational Linguistics vol. 27, issue 1, Mar. 2001, pp. 1-30.*

Jagadish, H. Ng, R. Srivastava, D. "Substring selectivity estimation" Symposium on Principles of Database Systems pp. 249-260, 1999.*

Mark Nelson, Fast String Searching With Suffix Trees, Dr. Dobb's Journal, Aug. 1996.

Hsin-Hsi Chen, et al., Description Of The NTU System Used For MET2, National Taiwan University, Taipei, Taiwan.

Walter Daelemans, et al., Rapid Development Of NLP Modules With Memory-Based Learning, ILK Computational Linguistics, Tilburg University, Tilburg, The Netherlands.

Walter Daelemans, et al., TiMBL: Tilburg Memory-Based Learner, version 5.1, Reference Guide, ILK Technical Report—ILK 04-02, Tilburg University, Dec. 31, 2004, Tilburg, The Netherlands.

Shihong Yu, et al., Description of The Kent Ridge Digital Labs System Used For MUC-7, Kent Ridge Digital Labs, Singapore.

Esko Ukkonen, On-line Construction of suffix trees, Algorithmica, University of Helinski, Finland.

Esko Ukkonen, Constructing Suffix Trees On-line In Linear Time, University of Helinski, Helinski, Finland.

Edward M. McCreight, A Space-Economical Suffix Tree Construction Algorithm, Journal of the Association for Computing Machinery, vol. 23, No. 2, Apr. 1976, pp. 262-272.

* cited by examiner

Primary Examiner—David Hudspeth
Assistant Examiner—Matthew J Sked
(74) Attorney, Agent, or Firm—Racheol Wu

(57) ABSTRACT

A method for entity name and jargon term recognition and extraction. An embodiment of the present invention uses a suffix tree data structure to determine frequently occurring phrases. In one embodiment text to be analyzed is preprocessed. The text is then separated into clauses and a suffix tree is created for the text. The suffix tree is used to determine repetitious segments. Unrecognized text fragment, occurring with a high frequency, have a comparably high probability of being a name entity or jargon term. The set of repetitious segments is then filtered to obtain a set of possible entity names and jargon terms.

27 Claims, 4 Drawing Sheets

| | PHRASES | FREQUENCIES | ACTIONS AND REASONS |
|---|---|---|---|
| EXAMPLE 1 | ······· (AB) <br> ··· (A) <br> ···· (B) | 7 <br> 8 <br> 7 | IF (AB) IS A PHRASE, A, B IS A PHRASE, THEIR FREQUENCY ARE SIMILAR, THEN REMOVE A AND B, ONLY RETAIN AB. |
| EXAMPLE 2 | ··· (AB) <br> ·· (A) <br> · (B) | 8 <br> 10 <br> 70 | B'S FREQ IS MUCH HIGHER THAN AB AND A, THEN ONLY A AND B ARE PHRASE. |
| EXAMPLE 3 | ···· (AB) <br> ··· (B) | 24 <br> 24 | B IS SUB STRING OF AB, THEIR FREQ ARE SIMILAR, THEN REMOVE B. |

FIG. 5

METHOD FOR EXTRACTING NAME ENTITIES AND JARGON TERMS USING A SUFFIX TREE DATA STRUCTURE

FIELD OF THE INVENTION

This invention relates generally to natural language processing, and more specifically, to an improved technique for the extraction of name entities and jargon terms.

BACKGROUND OF THE INVENTION

Natural language processing encompasses computer understanding, analysis, manipulation, and generation of natural language. From simplistic natural language processing applications, such as string manipulation (e.g., stemming) to higher-level tasks such as machine translation and question answering, the ability to identify and extract entity names and jargon terms in a text corpus is very important. Being able to identify proper names in the text is important to understanding and using the text. For example, in a Chinese-English machine translation system, if a person name is identified, it can be converted to pinyin (system for transliterating Chinese characters into the Latin alphabet) rather than being directly translated.

Entity names include the names of people, places, organizations, dates, times, monetary amounts and percentages, for example. Name entity and jargon term extraction involves identifying named entities in the context of a text corpus. For example, a name entity extraction must differentiate between "white house" as an adjective-noun combination, and "White House" as a named organization or a named location. In English the use of uppercase and lowercase letters may be indicative, but cannot be relied on to substantially determine name entities and jargon terms. Moreover, case does not aid name entity and jargon term recognition and extraction in languages in which case does not indicate proper nouns (e.g., Chinese) or in non-text modalities (e.g., speech).

There are three general methods that are typically employed for name entity and jargon term recognition and extraction. The first is to construct rules and keyword sets manually. This involves the use of hand-crafted modules encoding linguistic knowledge specific to the language and document genre. This method is easily implemented, but time consuming and prone to errors, moreover this model is not easily portable to new languages. A second technique involves the use of a statistical model (e.g., Hidden Markov Model) that requires a great deal of annotated training data. A third method is memory-based learning which treats the problem of entity extraction as a series of classification processes. Each of these methods is language dependent and relies on past experience. These are serious drawbacks in dealing with unrecognized entity names and jargon terms.

BRIEF DESCRIPTION OF THE DRAWINGS

The present invention is illustrated by way of example, and not limitation, by the figures of the accompanying drawings in which like references indicate similar elements and in which:

FIG. 5 illustrates examples of filtering high frequency phrases to obtain more probable entity name and jargon term candidates in accordance with one embodiment of the present invention.

DETAILED DESCRIPTION

An embodiment of the present invention includes the creation of a suffix tree data structure as part of a process to perform entity name and jargon term extraction on a text corpus. In one embodiment the text to be analyzed is preprocessed. The form and extent of preprocessing is typically language dependent, for example, Chinese may require spaces added between words. The text is then separated into clauses and a suffix tree is created for the text. The suffix tree is used to determine repetitious segments. The set of repetitious segments is then filtered to obtain a set of possible entity names and jargon terms. The set of possible entity names and jargon terms is then analyzed and filtered using known natural language processing techniques for entity name and jargon term recognition and extraction.

An embodiment of the present invention is based on the fact that an unrecognized text fragment, occurring with a high frequency, has a comparably high probability of being a name entity or jargon term. The use of a suffix tree structure to efficiently and accurately determine the text fragment frequencies may greatly improve name entity and jargon term recognition and extraction. For example, the phrase "Jack and Jill" may be a name entity referring to a poem or book title, or may be a jargon term referring to a couple. A typical name entity extraction technique may inaccurately identify "Jack" and "Jill" as separate name entities, and may discard "and" because it is a common, and frequently occurring word. However, using an embodiment of the present invention, it may be determined that "Jack" is connected to "Jill" with "and" exclusively, or with high frequency, throughout the document. Such analysis would indicate that "Jack and Jill" may be a name entity.

A suffix tree is a type of data structure used to simplify and accelerate text-string searches in extensive text corpuses. Suffix tree algorithms have evolved and become more efficient over the past twenty-five years. Suffix trees allow a one-time commitment of processing resources to construct a suffix tree. A fast and efficient search may then be made of any patterns/substrings within the suffix tree. Thus, whether a given text-string exists in the text, and, if so, how often it appears can be readily determined. Suffix trees may be applied to a wide variety text-string problems occurring in text editing, free-text search, and other search pattern applications involving a large amount of text. Today, suffix trees are primarily used for searching text. An embodiment of the present invention employs the suffix tree concept as part of a name entity and jargon term recognition and extraction process. A brief explanation of how a suffix tree is created and used in accordance with one embodiment of the present invention is included below in reference to FIGS. 2–4.

Figure 1:
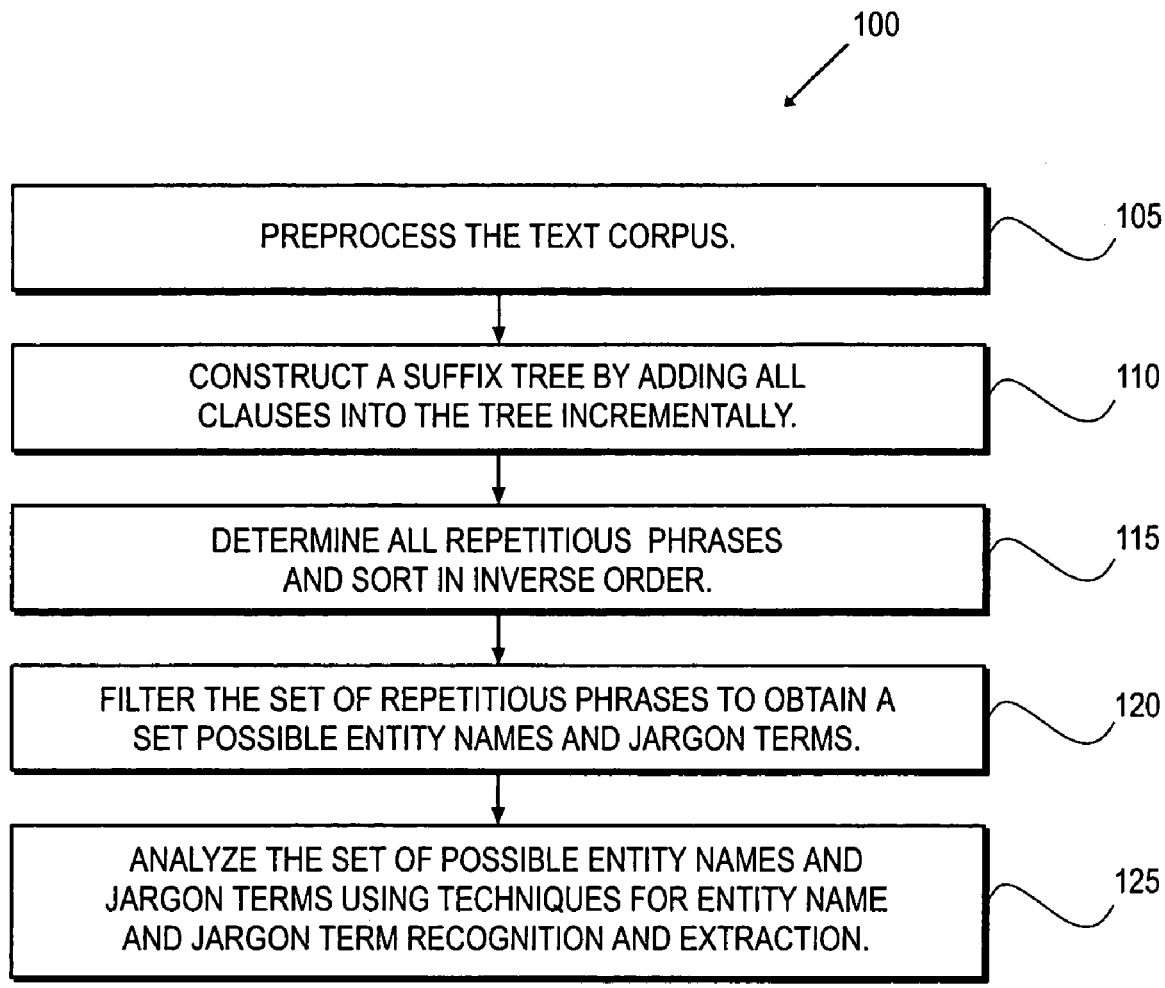
FIG. 1 is a process flow digram in accordance with one embodiment of the present invention.

FIG. 1 is a process flow diagram in accordance with one embodiment of the present invention. The process 100, shown in FIG. 1, begins at operation 105 in which the text corpus is preprocessed. This form and extent of preprocessing is language dependent. The intended result of the preprocessing is to have the text corpus separated into clauses. Some languages, such as Chinese, in which there are no spaces between words, may require that the text be separated into words and spaces inserted between the words. Separating the text into clauses, facilitates the construction of a suffix tree. At operation 110, a suffix tree is created by adding all clauses to the suffix tree incrementally.

Figure 2:
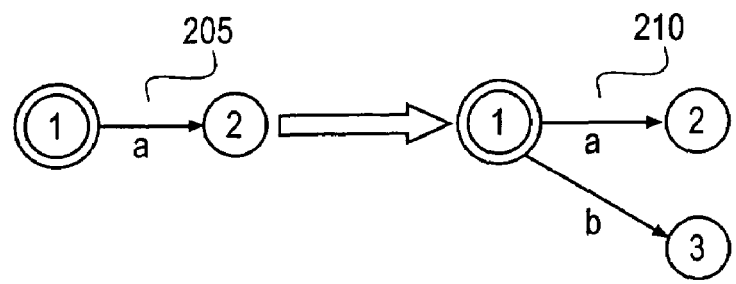
FIGS. 2–4 illustrate examples the incremental addition of clauses to the suffix tree in accordance with one embodiment of the present invention.
Figure 3:
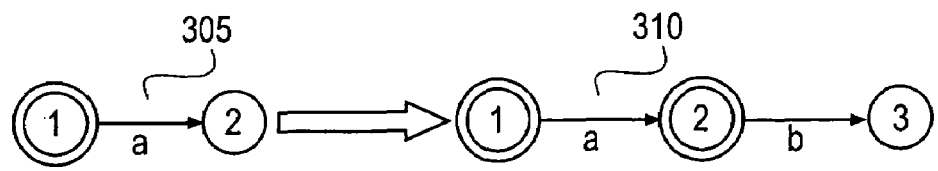
Figure 4:
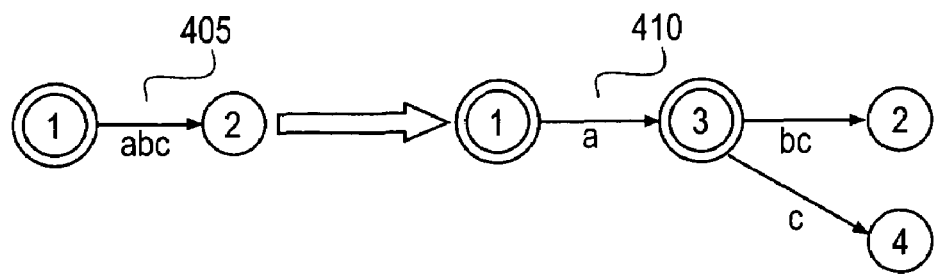

Many algorithms to create a suffix tree are known in the art. FIGS. 2–4 illustrate examples of how clauses may be added, incrementally, to the suffix tree in accordance with one embodiment of the present invention. The process involves two parameters, a startnode, an existing portion of the suffix tree and a string suffix, to be added to the suffix tree. For example, FIG. 2 illustrates the addition of a string suffix having no overlap with the existing suffix tree structure. Structure 205 comprises fork node 1 and leaf node 2 representing string edge "a" that may represent a word or phrase. Structure 210 shows the addition of string suffix "b" having no common elements. As shown in structure 210, a new leaf node, node 3, has been created to represent the string suffix "b" added to the suffix tree. What is represented by the suffix tree, then, are those string edges obtained by traversing from a fork node, or series of fork node, to a leaf node.

FIG. 3 illustrates the addition of a string suffix, "ab", to string edge "a". The string edge and the string suffix share the common element "a". In structure 305, fork node 1 and leaf node 2, represent the string edge "a". In structure 310, nodes 1 and 2 are fork nodes and leaf node 3 has been created.

FIG. 4, illustrates a more complex addition to the suffix tree. In FIG. 4, structure 405 comprises fork node 1 and leaf node 2 in which string edge "abc" is represented. By way of example, each element ("a", "b", "c",) of string edge "abc" may represent a word in a phrase, for example, "George Bush said" where "a" represents "George", "b" represents "Bush", and "c" represents "said". Structure 410 shows the incremental addition of a clause to the suffix tree. The clause added to the suffix tree is string suffix "ac", in this case representing the phrase "George said". In structure 410, the string edge "abc" has been split at the point of overlap (i.e., after element "a"). A new fork node, node 3, has been created as well as a new leaf node, node 4. Traversal from fork node 1, through fork node 3, to leaf node 4, represents the string suffix to be added, "ac". The original string edge, "abc" is represented by traversing from fork node 1, through fork node 3, to leaf node 2.

An exemplary algorithm for constructing a suffix tree in accordance with the present invention is included as Appendix A. This algorithm may be replaced with faster or more efficient suffix tree algorithms known in the art. Because suffix trees are general data structures that are independent of language, the method of one embodiment of the present invention is language independent. This is an important advantage in improving the performance for entity name extraction algorithms for languages such as Chinese that are less structured, and therefore more difficult to process, than, for example, English.

Referring again to FIG. 1, at operation 115 the repetitious phrases are determined from the suffix tree. The frequency of each phrase is stored in each corresponding fork node as the suffix tree is created. Those phrases that are unrecognized (as compared, for example, to a dictionary) and have high frequency occurrence are collected. The high-frequency phrases are then sorted in inverse lexicographical order. An embodiment of the invention is based on the fact that unrecognized text strings that occur at an unusually high frequency have a correspondingly high probability of being entity names or jargon terms. Of course not all high frequency phrases are entity names or jargon terms. Therefore the set of high frequency phrases is filtered to produce a smaller and more concise set (a set of high frequency phrases with a greater likelihood of being entity names or jargon terms) at operation 120.

By analyzing relative frequencies it is possible to determine that high-frequency fragments are probably not entity names or jargon terms. FIG. 5 illustrates three examples of filtering high frequency phrases to obtain more likely entity name and jargon term candidates in accordance with one embodiment of the present invention. As shown in Example 1 of FIG. 5, a phrase "AB", comprised of component phrases "A" and "B" appears with a comparable frequency to its component phrases. The component phrases (e.g., "A" and "B") may be confidently discarded as possible entity name or jargon term candidates and only the combined phrase "AB" retained. For example, the phrase "AB" corresponds to "Bill Clinton", with "A" corresponding to "Bill" and "B" corresponding to "Clinton". The relatively similar frequencies of "A", "B", and "AB" indicate that "Bill" and "Clinton" appeared, for the most part, as components of the name entity "Bill Clinton" and not as separate name entities. Therefore, "AB" ("Bill Clinton") may be retained as the name entity with "A" and "B" being discarded as separate name entities.

In Example 2, "B", a component of "AB" appears with a frequency much higher than "A" or "AB", although "A" and "AB" appear frequently. This indicates that "A" and "B" may be name entities or jargon terms, but that "AB" may be safely discarded. For example, "AB" may represent a phrase such as "George Bush said" with "A" representing "George Bush" and "B" representing "said". This indicates that "AB" ("George Bush said") is probably not a name entity, but that separately "A" ("George Bush") and "B" ("said") may be. Of course, "said" is not actually a name entity and will be eliminated as a candidate through comparison to a dictionary as will all common words. In Example 3, similar to Example 1, similar frequencies between "AB" and "B" indicate that "B" is a substring of "AB" and may be discarded as a name entity or jargon term candidate. Thus it is possible, using relative frequencies, to substantially, and with a high degree of confidence, reduce the number of high frequency phrases that are likely name entity or jargon term candidates.

Referring again to FIG. 1, at operation 125 commonly employed natural language processing techniques are employed to the list of candidate entity names and jargon terms. These techniques may be morphological, for example, using the fact that Chinese surname must be less than three characters. Syntactic or semantic techniques may be employed as well such as removing candidates that begin with a preposition. Most of these rules are language dependent and therefore the particular rules used for a given text or speech would, typically, vary with language.

Figure 6:
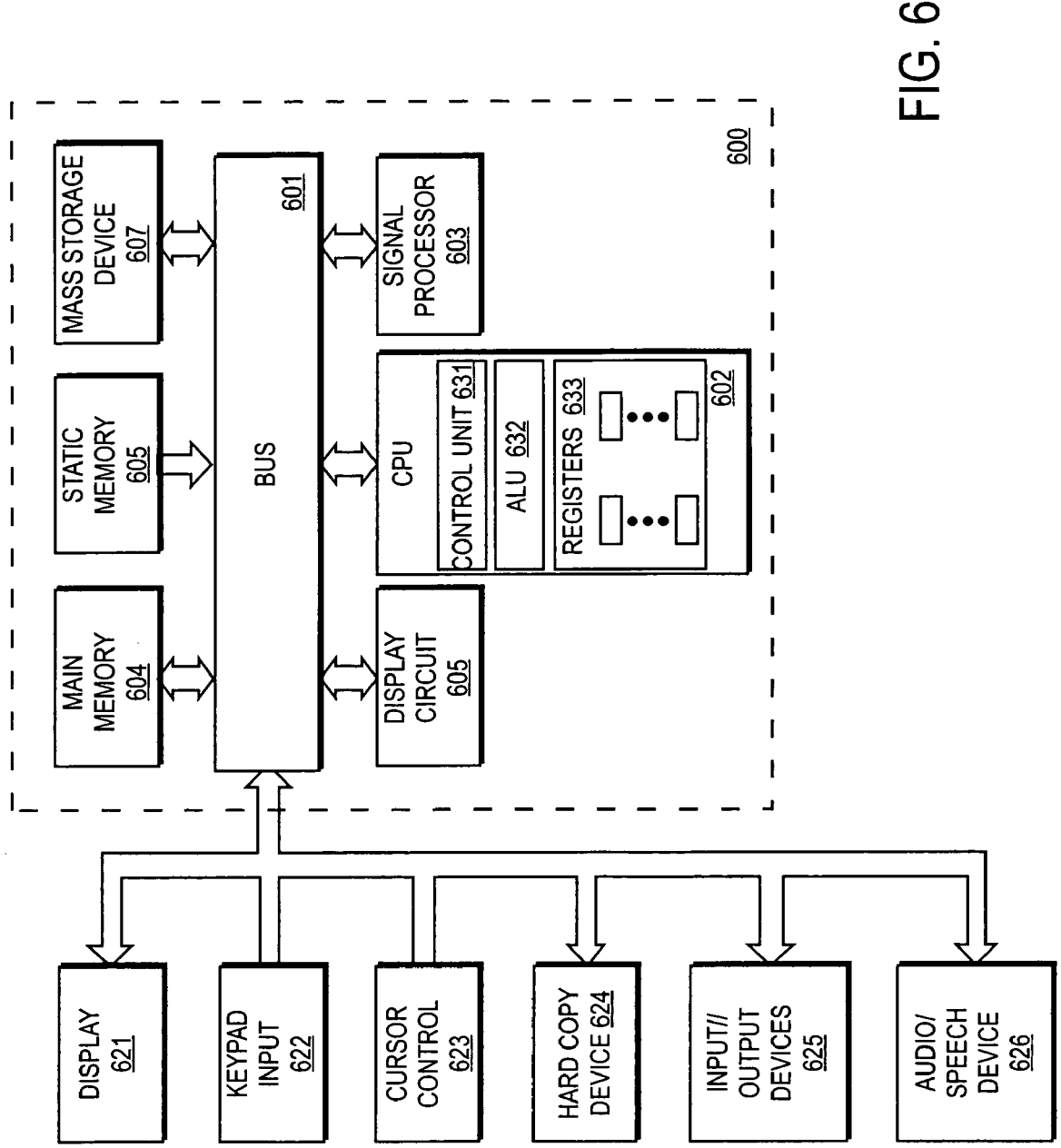
FIG. 6 is a diagram illustrating an exemplary computing system 600 for implementing the name entity and jargon term recognition and extraction process of the present invention.

FIG. 6 is a diagram illustrating an exemplary computing system 600 for implementing the name entity and jargon term recognition and extraction process of the present invention. The text processing, creation of a suffix tree, and candidate set filtering described herein can be implemented and utilized within computing system 600, which can represent a general-purpose computer, portable computer, or other like device. The components of computing system 600 are exemplary in which one or more components can be omitted or added. For example, one or more memory devices can be utilized for computing system 600.

Referring to FIG. 6, computing system 600 includes a central processing unit 602 and a signal processor 603 coupled to a display circuit 605, main memory 604, static memory 606, and mass storage device 607 via bus 601. Computing system 600 can also be coupled to a display 621, keypad input 622, cursor control 623, hard copy device 624, input/output (I/O) devices 625, and audio/speech device 626 via bus 601.

Bus 601 is a standard system bus for communicating information and signals. CPU 602 and signal processor 603 are processing units for computing system 600. CPU 602 or signal processor 603 or both can be used to process information and/or signals for computing system 600. CPU 602 includes a control unit 631, an arithmetic logic unit (ALU) 632, and several registers 633, which are used to process information and signals. Signal processor 603 can also include similar components as CPU 602.

Main memory 604 can be, e.g., a random access memory (RAM) or some other dynamic storage device, for storing information or instructions (program code), which are used by CPU 602 or signal processor 603. Main memory 604 may store temporary variables or other intermediate information during execution of instructions by CPU 602 or signal processor 603. Static memory 606, can be, e.g., a read only memory (ROM) and/or other static storage devices, for storing information or instructions, which can also be used by CPU 602 or signal processor 603. Mass storage device 607 can be, e.g., a hard or floppy disk drive or optical disk drive, for storing information or instructions for computing system 600.

Display 621 can be, e.g., a cathode ray tube (CRT) or liquid crystal display (LCD). Display device 621 displays information or graphics to a user. Computing system 600 can interface with display 621 via display circuit 605. Keypad input 622 is a alphanumeric input device with an analog to digital converter. Cursor control 623 can be, e.g., a mouse, a trackball, or cursor direction keys, for controlling movement of an object on display 621. Hard copy device 624 can be, e.g., a laser printer, for printing information on paper, film, or some other like medium. A number of input/output devices 625 can be coupled to computing system 600. The application of a suffix tree technique to name entity and jargon term recognition, in accordance with the present invention, may be implemented by hardware and/or software contained within computing system 600. For example, CPU 602 or signal processor 603 can execute code or instructions stored in a machine-readable medium, e.g., main memory 604.

The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions may be represented by carrier-wave signals, infrared signals, digital signals, and by other like signals.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

APPENDIX A

```
FOR all clauses in the document
    FOR all clauses in the document
        FOR all suffixes in the clause
            Add_a_Suffix (headnode, Suffix);
Add_a_Suffix (NODE *startNode, char * strSuffix)
{
    Find out whether there ixists an edge strEdge that has same prefix with input string strSuffix;
    IF exists the edge
    {
        Let strOverlap = strEdge ∩ strSuffix,
        (Here the strOverlap is the prefix shared between strEdge and strSuffix,
        e.g. if strEdge is 'abc', strSuffix is 'ab', then the strOverlap is 'ab'.)
            strEdgeLeft = strSuffix - strOverlap;
            (here strEdgeLeft is the part of strEdge that is left when removing
            strOverlap from it, e.g. in last example, it is 'c'.)
            strSentLeft = strSuffix - strOverlap;
            (here strSentLeft is the part of strSuffix that is left when removing
            strOverlap from it, e.g. in last example, it is NULL.)
        IF strEdgeLeft = = NULL
                Add_a_Suffix (edge->end, strSentLeft);
        ELSE
        Create a new fork node, and split the edge;
    }
    Create a new leaf node;
}
```

What is claimed is:

1. A method comprising:

creating a suffix tree to determine the frequency of phrases within a text corpus;

specifying a set of frequently occurring phrases; and filtering the set of frequently occurring phrases to determine a set of frequently occurring and unrecognized phrases as entity name and jargon term candidates, wherein filtering the set of frequently occurring phrases includes comparing a component word of a phrase to a dictionary of common words and excluding the phrase from the set of entity name and jargon term candidates if the component word is a common word.

2. The method of claim 1 further comprising:

sorting each phrase of the set of frequently occurring phrases in inverse lexicographical order prior to filtering the set of frequently occurring phrases.

3. The method of claim 1 wherein the text corpus is preprocessed.

4. The method of claim 3 wherein the text corpus is text of a human language.

5. The method of claim 4 wherein the human language is Chinese.

6. The method of claim 4 further comprising:
reducing the set of entity name and jargon term candidates by applying natural language processing rules.

7. The method of claim 6 wherein the natural language processing rules are rules selected from the list consisting of morphological rules, semantic rules, and syntactic rules.

8. The method of claim 1, wherein filtering comprises:
excluding a phrase from the set of frequently occurring phrases, wherein the phrase comprises a sub-phrase that occurs at a higher frequency than the phrase.

9. The method of claim 1, wherein the filtering comprises:
excluding an embedded phrase from the set of frequently occurring phrases, wherein the embedded phrase is embedded by an embedding phrase that occurs at a similar frequency with the embedded phrase.

10. A system comprising:
a memory having stored therein executable instructions which when executed by a processor, cause the processor to perform operations comprising:
creating a suffix tree data structure, the suffix tree data structure storing phrase frequency data for a text corpus;
using the phrase frequency data to specify a set of frequently occurring phrases; and
filtering the set of frequently occurring phrases to determine a set of frequently occurring and unrecognized phrases as entity name and jargon term candidates; and
a processor to execute the instructions,
wherein filtering the set of frequently occurring phrases includes comparing a component word of a phrase to a dictionary of common words and excluding the phrase from the set of entity name and jargon term candidates if the component word is a common word.

11. The system of claim 10 wherein the operations further comprise:
sorting each phrase of the set of frequently occurring phrases in inverse lexicographical order prior to filtering the set of frequently occurring phrases.

12. The system of claim 10 wherein the text corpus is preprocessed.

13. The system of claim 12 wherein the text corpus is text of a human language.

14. The system of claim 13 wherein the human language is Chinese.

15. The system of claim 13 further comprising:
reducing the set of entity name and jargon term candidates by applying natural language processing rules.

16. The system of claim 15 wherein the natural language processing rules are rules selected from the list consisting of morphological rules, semantic rules, and syntactic rules.

17. The system of claim 10 wherein filtering comprises:
excluding a phrase from the set of frequently occurring phrases, wherein the phrase comprises a sub-phrase that occurs at a higher frequency than the phrase.

18. The system of claim 10 wherein the filtering comprises:
excluding an embedded phrase from the set of frequently occurring phrases, wherein the embedded phrase is embedded by an embedding phrase that occurs at a similar frequency with the embedded phrase.

19. A machine-readable medium containing instructions which, when executed by a processor, cause the processor to perform a method, the method comprising:
creating a suffix tree to determine the frequency of phrases within a text corpus;
specifying a set of frequently occurring phrases; and
filtering the set of frequently occurring phrases to determine a set of frequently occurring and unrecognized phrases as entity name and jargon term candidates,
wherein the filtering comprises excluding an embedded phrase from the set of frequently occurring phrases, wherein the embedded phrase is embedded by an embedding phrase that occurs at a similar frequency with the embedded phrase.

20. The machine-readable medium of claim 19 wherein the method further comprises:
sorting each phrase of the set of frequently occurring phrases in inverse lexicographical order prior to filtering the set of frequently occurring phrases.

21. The machine-readable medium of claim 19 wherein the text corpus is preprocessed.

22. The machine-readable medium of claim 21 wherein the text corpus is text of a human language.

23. The machine-readable medium of claim 22 wherein the human language is Chinese.

24. The machine-readable medium of claim 22 wherein filtering the set of frequently occurring phrases includes comparing a component word of a phrase to a dictionary of common words and excluding the phrase from the set of entity name and jargon term candidates if the component word is a common word.

25. The machine-readable medium of claim 22 wherein the method further comprises:
reducing the set of entity name and jargon term candidates by applying natural language processing rules.

26. The machine-readable medium of claim 25 wherein the natural language processing rules are rules selected from the list consisting of morphological rules, semantic rules, and syntactic rules.

27. The machine-readable medium of claim 19 wherein filtering comprises:
excluding a phrase from the set of frequently occurring phrases, wherein the phrase comprises a sub-phrase that occurs at a higher frequency than the phrase.

\* \* \* \* \*

UNITED STATES PATENT AND TRADEMARK OFFICE
CERTIFICATE OF CORRECTION

PATENT NO. : 7,197,449 B2  Page 1 of 1
APPLICATION NO. : 10/017408
DATED : March 27, 2007
INVENTOR(S) : Hu et al.

It is certified that error appears in the above-identified patent and that said Letters Patent is hereby corrected as shown below:

In column 1, at line 63, delete "digram" and insert --diagram--.

Signed and Sealed this

Second Day of September, 2008

JON W. DUDAS
*Director of the United States Patent and Trademark Office*